(12) United States Patent
Siraisi et al.

(10) Patent No.: US 12,428,229 B2
(45) Date of Patent: Sep. 30, 2025

(54) ARTICLE STORAGE FACILITY

(71) Applicant: Daifuku Co., Ltd., Osaka (JP)

(72) Inventors: Tooru Siraisi, Tokyo (JP); Tooru Arii, Tokyo (JP); Takehito Ito, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 518 days.

(21) Appl. No.: 18/018,150

(22) PCT Filed: May 18, 2021

(86) PCT No.: PCT/JP2021/018813
§ 371 (c)(1),
(2) Date: Jan. 26, 2023

(87) PCT Pub. No.: WO2022/024507
PCT Pub. Date: Feb. 3, 2022

(65) Prior Publication Data
US 2023/0348186 A1 Nov. 2, 2023

(30) Foreign Application Priority Data
Jul. 27, 2020 (JP) .................... 2020-126204

(51) Int. Cl.
*B65G 1/02* (2006.01)
*B65G 1/04* (2006.01)
*B65G 1/06* (2006.01)

(52) U.S. Cl.
CPC .............. *B65G 1/06* (2013.01); *B65G 1/02* (2013.01); *B65G 1/04* (2013.01); *B65G 1/0414* (2013.01); *B65G 1/0421* (2013.01); *B65G 1/065* (2013.01)

(58) Field of Classification Search
CPC ...... B65G 1/06; B65G 1/0421; B65G 1/0414; B65G 1/02; B65G 1/04; B65G 1/065
See application file for complete search history.

(56) References Cited

U.S. PATENT DOCUMENTS

| | | | |
|---|---|---|---|
| 2007/0032903 A1* | 2/2007 | Tsujimoto ............ | B65G 1/0407 700/214 |
| 2016/0167879 A1* | 6/2016 | Masuda ............... | B65G 1/0421 414/274 |

(Continued)

FOREIGN PATENT DOCUMENTS

| | | | |
|---|---|---|---|
| JP | 797006 A | 4/1995 | |
| JP | 9240809 A | 9/1997 | |
| JP | 2014205524 A | * 10/2014 | ............... B65G 1/04 |

*Primary Examiner* — Thomas Randazzo
(74) *Attorney, Agent, or Firm* — The Webb Law Firm

(57) ABSTRACT

An unloading priority mode is a mode for causing a transport device to execute a first transfer operation, a second transfer operation, a first travel operation, a third transfer operation, and a second travel operation in this order. The first transfer operation is an operation of transferring a second article to the transport device. The second transfer operation is an operation of transferring a first article to the transport device. The first travel operation is an operation of traveling to a position corresponding to a relay section while holding the first article and the second article. The third transfer operation is an operation of transferring the first article to the relay section, and thereafter transferring a third article to the transport device. The second travel operation is an operation of traveling to a position corresponding to a storage section while holding the second article and the third article.

3 Claims, 8 Drawing Sheets

(56) References Cited

U.S. PATENT DOCUMENTS

2018/0178979 A1\* 6/2018 Bretz .................... B65G 1/0407
2018/0370729 A1\* 12/2018 Ueda ...................... B65G 1/065

\* cited by examiner

ARTICLE STORAGE FACILITY

CROSS-REFERENCE TO RELATED APPLICATIONS

This application is the United States national phase of International Application No. PCT/JP2021/018813 filed May 18, 2021, and claims priority to Japanese Patent Application No. 2020-126204 filed Jul. 27, 2020, the disclosures of which are hereby incorporated by reference in their entireties.

BACKGROUND OF THE INVENTION

Field of the Invention

The present invention relates to an article storage facility including: an article storage rack including a storage section in which a plurality of articles are storable next to each other in a depth direction; a relay device configured to transport an article between a loading/unloading section and a relay section; and a transport device configured to transport an article between the relay section and the storage section.

Description of Related Art

JP H07-97006A (Patent Document 1) discloses an example of an article storage facility that includes an article storage rack in which a plurality of articles are storable next to each other in the depth direction. In the following description of background art, reference numerals shown in parentheses are those used in Patent Document 1. The article storage facility described in Patent Document 1 includes a storage rack (7) in which two articles (8, 9) are storable next to each other in the depth direction and a work transport facility (3) configured to transport the stored articles (8, 9) between a loading/unloading port (6) and the storage rack (7). The work transport facility (3) includes two loading/unloading facilities (4, 5) that are arranged in a width direction of the storage rack (7) and configured to place the articles (8, 9) into the storage rack (7) and take the articles (8, 9) out of the storage rack (7). As described in paragraph 0015 of Patent Document 1, when unloading an article (9) stored on the rear side in the article storage facility without unloading an article (8) stored on the front side, the work transport facility (3) takes out the front-side article (8) with use of a first loading/unloading facility (4) and thereafter takes out the rear-side article (9) with use of a second loading/unloading facility (5). Then, the work transport facility (3) returns the front-side article (8) to the storage rack (7) with use of the first loading/unloading facility (4) and thereafter travels to the loading/unloading port (6) to carry out the rear-side article (9) to the loading/unloading port (6).

PATENT DOCUMENTS

Patent Document 1: JP H07-97006A

As described in paragraph 0003 of Patent Document 1, sometimes there arises an urgent need to unload an article stored in an article storage rack (in Patent Document 1, an article stored in the storage rack). In a case where the article that is to be unloaded (hereinafter referred to as a "first article") is behind (on the rear side of) another article (hereinafter referred to as a "second article") that is not to be unloaded in the article storage rack of the article storage facility described in Patent Document 1, the second article and the first article are taken out from the article storage rack in this order, the second article is then returned to the article storage rack, and thereafter the first article is carried out to a relay section (in Patent Document 1, the loading/unloading port) for unloading articles, as described above. Therefore, the time it takes until the first article is carried out to the relay section increases due to the time it takes to return the second article to the article storage rack, and there is room for improvement in reducing the time it takes until the first article is carried out to the relay section. It is desirable to reduce the time it takes until the first article is carried out to the relay section while improving the efficiency of transporting articles in the entire facility.

SUMMARY OF THE INVENTION

Under the above circumstances, it is desired to realize a technology that makes it possible to reduce the time it takes until an article to be unloaded is carried out to the relay section when the article to be unloaded is behind another article that is not to be unloaded in the article storage rack, while improving the efficiency of transporting articles in the entire facility.

An article storage facility according to the present disclosure includes: an article storage rack including a storage section in which a plurality of articles are storable next to each other in a depth direction; a loading/unloading section that is outside the storage section in a width direction of the article storage rack and through which an article is carried in and carried out; a relay device configured to transport an article between the loading/unloading section and a relay section that is between the loading/unloading section and the storage section in the width direction; a transport device configured to travel in the width direction on a front side in the depth direction relative to the storage section and transport an article between the storage section and the relay section; and a control device configured to control operations of the transport device, in which the transport device includes a plurality of transfer devices that are next to each other in the width direction, are capable of transferring articles to the storage section and the relay section, and include a first transfer device and a second transfer device, the control device is configured to be capable of switching a control mode of the transport device to an unloading priority mode in a case where a first article that is to be unloaded from the article storage rack is arranged next to a second article that is not to be unloaded from the article storage rack, on a rear side of the second article in the storage section, the rear side being opposite to the front side in the depth direction, the unloading priority mode is a mode for causing the transport device to execute a first transfer operation, a second transfer operation, a first travel operation, a third transfer operation, and a second travel operation in this order, the first transfer operation is an operation of transferring the second article from the storage section to the transport device with use of the second transfer device, the second transfer operation is an operation of transferring the first article from the storage section to the transport device with use of the first transfer device, the first travel operation is an operation of traveling to a position corresponding to the relay section while holding the first article and the second article, the third transfer operation is an operation of transferring the first article from the transport device to the relay section with use of the first transfer device, and thereafter transferring a third article carried into the relay section by the relay device, from the relay section to the transport device with use of the first transfer device, and the second travel operation is an operation of traveling to a position corresponding to the storage section while holding the second article and the third article.

According to this configuration, the control mode of the transport device can be switched to the unloading priority mode in the case where the first article to be unloaded from the article storage rack is arranged next to the second article that is not to be unloaded from the article storage rack, on the rear side of the second article in the storage section of the article storage rack. In the unloading priority mode, it is possible to transfer the second article and the first article in this order from the storage section to the transport device, then cause the transport device holding the second article as well as the first article to travel to the position corresponding to the relay section, and transfer the first article from the transport device to the relay section. Accordingly, when compared with a case where the transport device holding the first article is caused to travel to the position corresponding to the relay section after the second article is transferred from the transport device to the storage section (i.e., returned to the storage section), the time it takes until the first article is carried out to the relay section can be reduced because an operation for transferring the second article from the transport device to the storage section is not performed.

Furthermore, in the unloading priority mode, after the first article is transferred from the transport device to the relay section, the third article carried into the relay section by the relay device (i.e., an article to be loaded into the article storage rack) can be transferred from the relay section to the transport device, and then the transport device holding the second article and the third article can be caused to travel to the position corresponding to the storage section to transfer the second article and the third article from the transport device to the storage section. Therefore, the third article can be transported from the relay section to the position corresponding to the storage section with use of the travel operation of the transport device for returning the second article to the storage section, and the efficiency of transporting articles in the entire facility can be improved when compared with a case where the second article is returned to the storage section without the operation for transferring the third article from the relay section to the transport device being performed.

As described above, according to this configuration, in the case where the first article is arranged next to the second article on the rear side of the second article in the article storage rack, it is possible to reduce the time it takes until the first article is carried out to the relay section while improving the efficiency of transporting articles in the entire facility.

Further features and advantages of the article storage facility will be clarified by embodiments described below with reference to the drawings.

DESCRIPTION OF THE INVENTION

The following describes an embodiment of an article storage facility with reference to the drawings. Here, a case is described as an example in which an article storage facility according to the present disclosure is applied to an article storage facility in which a transport device travels along a travel path formed in correspondence with each stage of an article storage rack.

Figure 1:
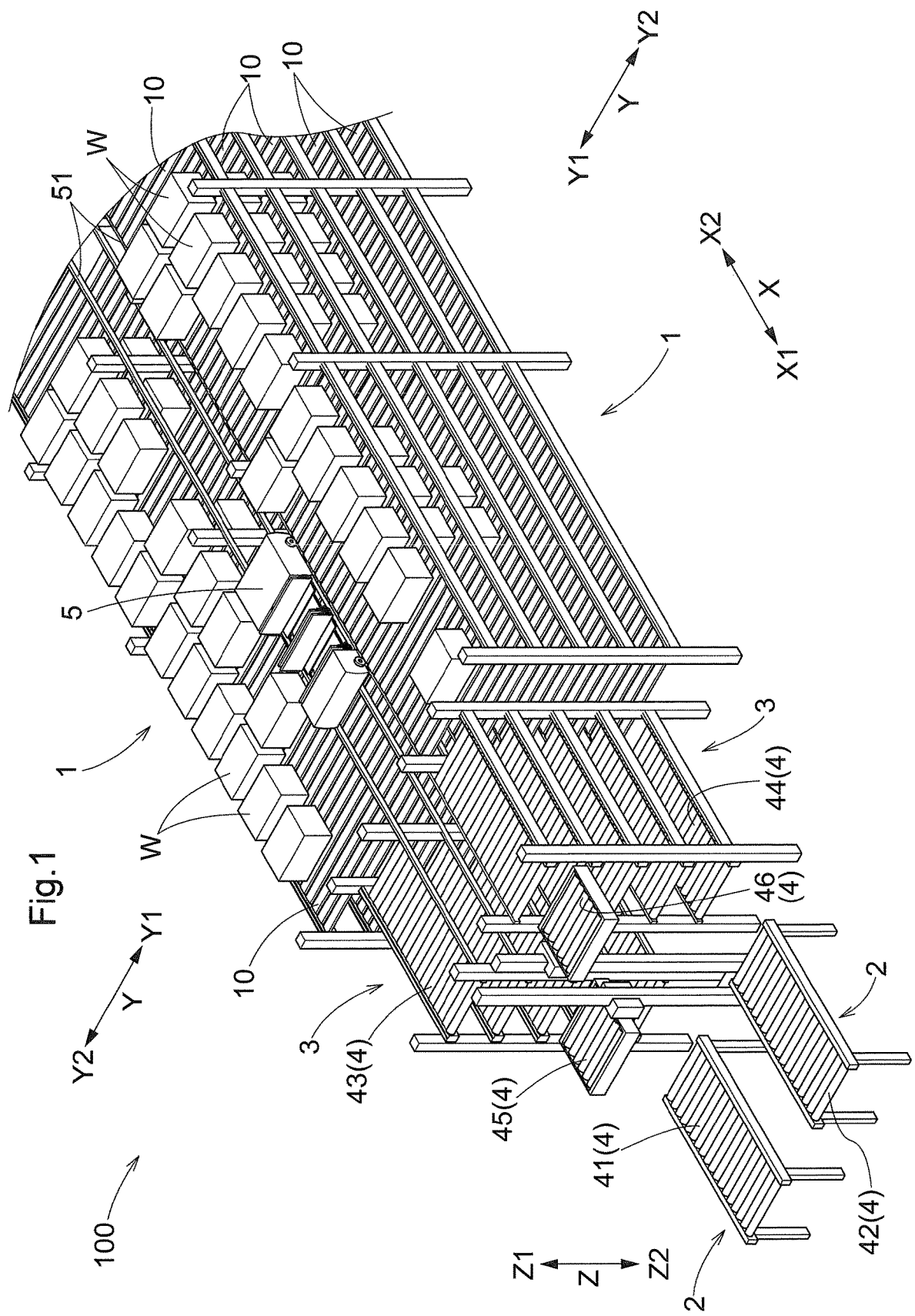
FIG. 1 is a perspective view of a portion of an article storage facility.
Figure 2:
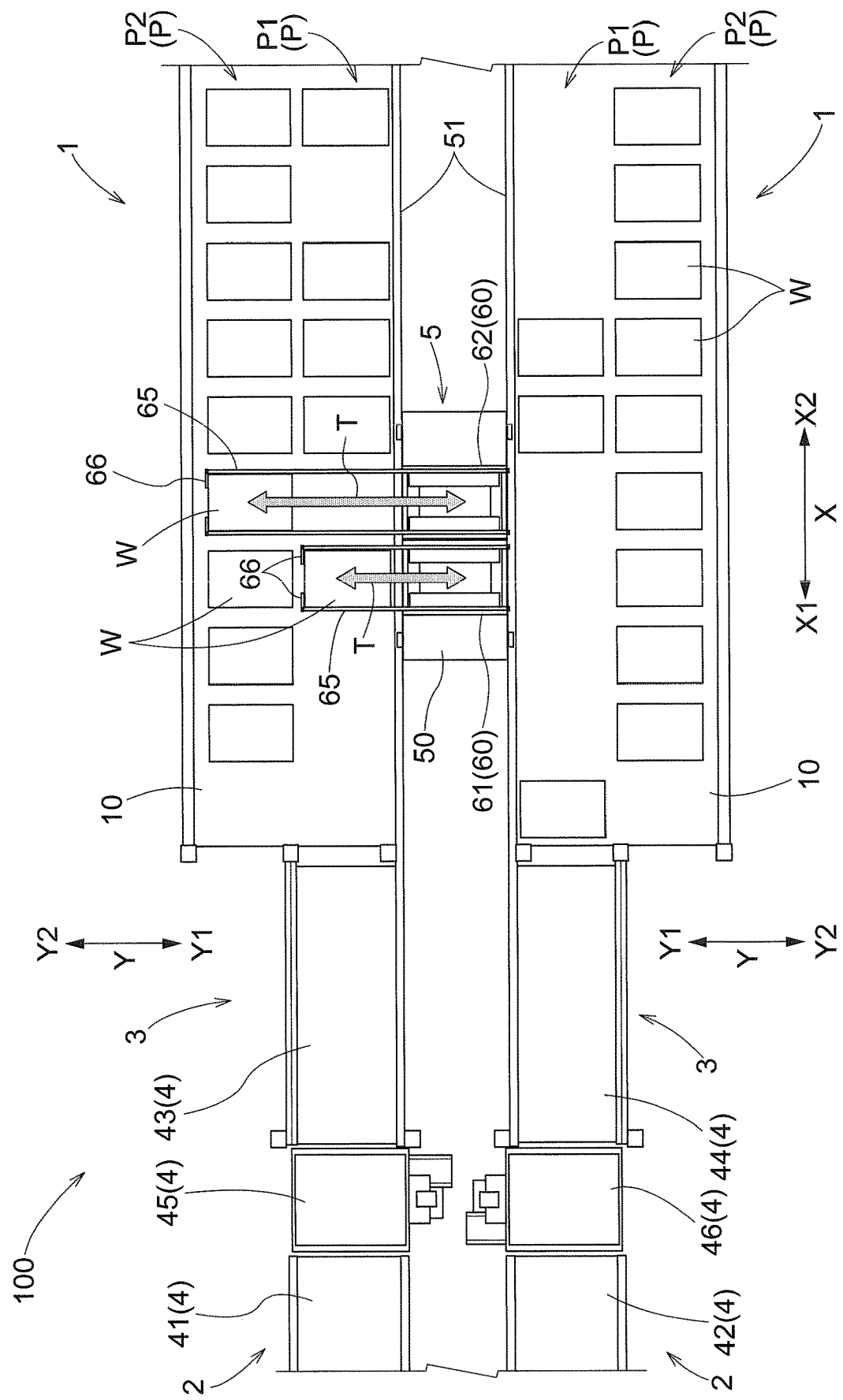
FIG. 2 is a plan view of a portion of the article storage facility.
Figure 3:
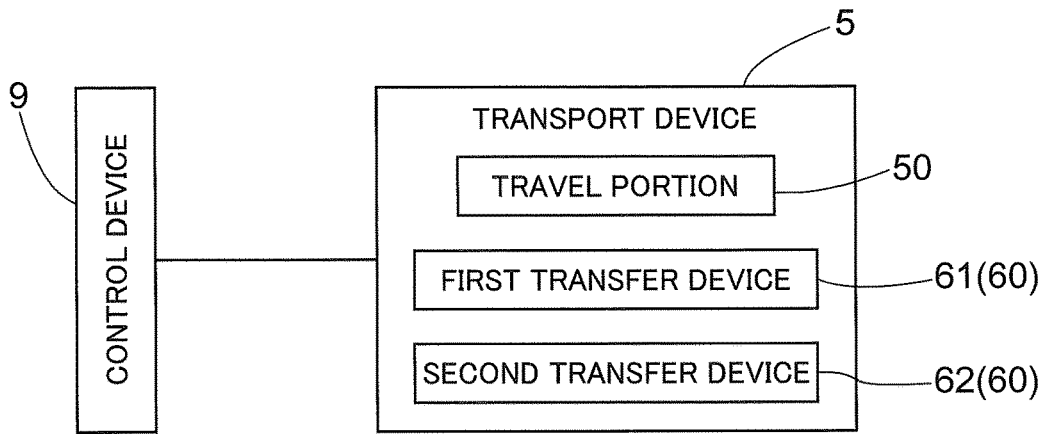
FIG. 3 is a control block diagram.

As shown in FIG. 1, an article storage facility 100 includes an article storage rack 1, a loading/unloading section 2, a relay device 4, a transport device 5, and a control device 9 (see FIG. 3). The article storage rack 1 includes a storage section 10 in which a plurality of articles W are storable next to each other in a depth direction Y. Positions in the depth direction Y at which the articles W are stored in the storage section 10 will be referred to as storage positions P as shown in FIG. 2. The storage section 10 supports the articles W from a lower side Z2 (the lower side in an up-down direction Z). Examples of the articles W include cardboard cases and container cases. The depth direction Y is orthogonal to a width direction X of the article storage rack 1. Here, the width direction X and the depth direction Y are both horizontal directions extending along a horizontal plane. In the present embodiment, a pair of article storage racks 1 are installed facing each other in the depth direction Y and sandwiching a travel path of the transport device 5. A configuration is also possible in which the article storage rack 1 is provided only on one side in the depth direction Y relative to the travel path of the transport device 5.

As shown in FIGS. 1 and 2, the storage section 10 in the present embodiment is configured to be capable of storing two articles W next to each other in the depth direction Y. That is, in the present embodiment, an article W is stored at either one of two storage positions P (specifically, a first storage position P1 and a second storage position P2) in the storage section 10. As shown in FIG. 2, out of the two storage positions P, a storage position P that is on a front side Y1 is the first storage position P1, and a storage position P that is on a rear side Y2 is the second storage position P2. Here, the front side Y1 is one side in the depth direction Y (specifically, the side from which articles W are placed into and taken out from the storage section 10), and the rear side Y2 is opposite to the front side Y1 in the depth direction Y.

As shown in FIG. 2, the storage section 10 is configured to be capable of storing a plurality of articles W next to each other in the width direction X. That is, the storage section 10 is configured to be capable of storing a plurality of articles W next to each other in the width direction X at each storage position P (here, each of the first storage position P1 and the second storage position P2). The storage section 10 in which a plurality of articles W are storable next to each other in the width direction X can be obtained by arranging a plurality of plate-like bodies in the width direction X, for example. Each plate-like body is formed into a rectangular shape in a plan view (as viewed in the up-down direction Z) or a U-shape that is open on the front side Y1 in a plan view, for example.

In the present embodiment, each article storage rack 1 includes storage sections 10 at a plurality of positions in the up-down direction Z (vertical direction), and is configured to be capable of storing articles W on each of a plurality of stages (shelves) arranged in the up-down direction Z. Note that a configuration is also possible in which each article storage rack 1 includes the storage section 10 only at a single position in the up-down direction Z.

The loading/unloading section 2 is outside the storage sections 10 in the width direction X. That is, the loading/unloading section 2 is outside the region in which the storage sections 10 are located in the width direction X. The loading/unloading section 2 is on a first side X1 in the width direction X relative to the storage sections 10. In other words, the storage sections 10 are on a second side X2 that is the other side in the width direction X (i.e., the side opposite to the first side X1 in the width direction X), relative to the loading/unloading section 2. Articles W are carried in and carried out through the loading/unloading section 2. Specifically, an article W that is to be loaded into the article storage rack 1 is carried into the loading/unloading section 2 from a loading line or the like, and an article W that is unloaded from the article storage rack 1 is carried out from the loading/unloading section 2 to an unloading line or the like. Note that articles W may be carried into or out from the loading/unloading section 2 by a transport vehicle, a worker, or the like.

As shown in FIGS. 1 and 2, in the present embodiment, a first conveyor 41 and a second conveyor 42 are provided in the loading/unloading section 2. In other words, the loading/unloading section 2 is provided on a transport path along which articles W are transported by the first conveyor 41 and a transport path along which articles W are transported by the second conveyor 42. The first conveyor 41 is a loading conveyor for loading articles W into the article storage rack 1, and transports articles W toward the second side X2 in the width direction in the loading/unloading section 2. The second conveyor 42 is an unloading conveyor for unloading articles W from the article storage rack 1, and transports articles W toward the first side X1 in the width direction in the loading/unloading section 2. The first conveyor 41 constitutes the loading line, for example, and the second conveyor 42 constitutes the unloading line, for example. Roller conveyors or belt conveyors can be used as the first conveyor 41 and the second conveyor 42, for example. Note that a configuration is also possible in which the first conveyor 41 and the second conveyor 42 can be used as either the loading conveyor or the unloading conveyor according to the state of the article storage facility 100 at that time.

As shown in FIGS. 1 and 2, there is a relay section 3 between the loading/unloading section 2 and each storage section 10 in the width direction X. Specifically, the relay section 3 is adjacent to the storage section 10 on the first side X1 in the width direction relative to the storage section 10. An article W to be loaded into the article storage rack 1 is transported from the loading/unloading section 2 via the relay section 3 to the storage section 10, and an article W to be unloaded from the article storage rack 1 is transported from the storage section 10 via the relay section 3 to the loading/unloading section 2.

In the present embodiment, a third conveyor 43 and a fourth conveyor 44 are provided in the relay section 3. In other words, the relay section 3 is provided on a transport path along which articles W are transported by the third conveyor 43 and a transport path along which articles W are transported by the fourth conveyor 44. The third conveyor 43 is a loading conveyor for loading articles W into the article storage rack 1, and transports articles W toward the second side X2 in the width direction in the relay section 3. The fourth conveyor 44 is an unloading conveyor for unloading articles W from the article storage rack 1, and transports articles W toward the first side X1 in the width direction in the relay section 3. Roller conveyors or belt conveyors can be used as the third conveyor 43 and the fourth conveyor 44, for example. Note that a configuration is also possible in which the third conveyor 43 and the fourth conveyor 44 can be used as either the loading conveyor or the unloading conveyor according to the state of the article storage facility 100 at that time.

As described above, the present embodiment includes the pair of article storage racks 1 facing each other in the depth direction Y and sandwiching the travel path of the transport device 5. The third conveyor 43 is next to the storage sections 10 of one of the article storage racks 1 on the first side X1 in the width direction X relative to the storage sections 10, and the fourth conveyor 44 is next to the storage sections 10 of the other article storage rack 1 on the first side X1 in the width direction X relative to the storage sections 10. The above-described first conveyor 41 is next to the third conveyor 43 on the first side X1 in the width direction X relative to the third conveyor 43, and the above-described second conveyor 42 is next to the fourth conveyor 44 on the first side X1 in the width direction X relative to the fourth conveyor 44.

As shown in FIG. 1, in the present embodiment, relay sections 3 are respectively provided at heights (positions in the up-down direction Z) at which the storage sections 10 are located. Specifically, the third conveyor 43 and the fourth conveyor 44 are provided at each height at which a storage section 10 is located. A first lift device 45 and a second lift device 46 are provided between the loading/unloading section 2 and the relay sections 3 in the width direction X. The first lift device 45 is sandwiched between the first conveyor 41 and the third conveyors 43 from both sides in the width direction X, and the second lift device 46 is sandwiched between the second conveyor 42 and the fourth conveyors 44 from both sides in the width direction X. The first lift device 45 and the second lift device 46 are configured to be movable upward and downward (i.e., movable in the up-down direction Z). In a state where the first lift device 45 is moved to the height corresponding to the first conveyor 41, an article W is transported between the first lift device 45 and the first conveyor 41, and in a state where the first lift device 45 is moved to a height corresponding to any of the third conveyors 43, an article W is transported between the first lift device 45 and the third conveyor 43. Also, in a state where the second lift device 46 is moved to the height corresponding to the second conveyor 42, an article W is transported between the second lift device 46 and the second conveyor 42, and in a state where the second lift device 46 is moved to a height corresponding to any of the fourth conveyors 44, an article W is transported between the second lift device 46 and the fourth conveyor 44.

The relay device 4 transports articles W between the loading/unloading section 2 and the relay sections 3. The relay device 4 transports an article W to be loaded into the article storage rack 1 from the loading/unloading section 2 to a relay section 3, and transports an article W unloaded from the article storage rack 1 from a relay section 3 to the loading/unloading section 2. In the present embodiment, the relay device 4 includes the first conveyor 41, the second conveyor 42, the third conveyors 43, the fourth conveyors 44, the first lift device 45, and the second lift device 46. An article W to be loaded into the article storage rack 1 is transported from the loading/unloading section 2 to a relay section 3 by the first conveyor 41, the first lift device 45, and a third conveyor 43 in this order. An article W unloaded from the article storage rack 1 is transported from a relay section 3 to the loading/unloading section 2 by a fourth conveyor 44, the second lift device 46, and the second conveyor 42 in this order.

As described above, the relay device 4 in the present embodiment is configured to transport an article W from the loading/unloading section 2 to a relay section 3 with use of a group of devices including the first conveyor 41 and the third conveyors 43 (in this example, the group of devices further includes the first lift device 45), and transport an article W from a relay section 3 to the loading/unloading section 2 with use of a group of devices including the second conveyor 42 and the fourth conveyors 44 (in this example, the group of devices further includes the second lift device 46). Note that the relay device 4 may also be configured to use a group of devices to transport an article W from the loading/unloading section 2 to a relay section 3 and transport an article W from a relay section 3 to the loading/unloading section 2. In this case, the relay device 4 may be configured to include only one of the two groups of devices described above.

The transport device 5 travels in the width direction X on the front side Y1 of the storage sections 10 and transports articles W between the storage sections 10 and the relay sections 3 (in the present embodiment, the third conveyors 43 and the fourth conveyors 44). That is, the transport device 5 performs a travel operation R of traveling in the width direction X and a transfer operation T of transferring an article W to a storage section 10 or a relay section 3. The transport device 5 transports an article W to be loaded into the article storage rack 1 from a relay section 3 (in the present embodiment, a third conveyor 43) to a storage section 10, and transports an article W to be unloaded from the article storage rack 1 from a storage section 10 to a relay section 3 (in the present embodiment, a fourth conveyor 44). As shown in FIG. 1, in the present embodiment, the same number of travel paths of the transport device 5 as the number of stages in each article storage rack 1 (in other words, the number of storage sections 10 arranged in the up-down direction Z) are formed in correspondence with the respective stages in the article storage rack 1. Specifically, as shown in FIGS. 1 and 2, each travel path of the transport device 5 is formed by a pair of rails 51 facing each other in the depth direction Y at the same position in the up-down direction Z. The transport device 5 is disposed on the travel path of each stage, and transports articles W between a storage section 10 and a relay section 3 in the same stage (in other words, between the storage section 10 and the relay section 3 located at the same position in the up-down direction Z). FIG. 1 shows only the uppermost transport device 5 on an upper side Z1 (the upper side in the up-down direction Z).

As shown in FIG. 2, each transport device 5 includes a plurality of transfer devices 60 that are next to each other in the width direction X and capable of transferring articles W to the storage section 10 and the relay section 3. The transport device 5 performs the transfer operation T of transferring articles W, with use of the transfer devices 60. The transport device 5 includes a travel portion 50 configured to travel in the width direction X, and the transfer devices 60 are supported by the travel portion 50. As described above, the present embodiment includes the pair of article storage racks 1 facing each other in the depth direction Y and sandwiching the travel path of the transport device 5, and the transport device 5 is configured to be capable of transferring articles W to the storage sections 10 of both of the pair of article storage racks 1 with use of the transfer devices 60.

Here, one of the plurality of transfer devices 60 will be referred to as a "first transfer device 61", and another transfer device 60 will be referred to as a "second transfer device 62". In the present embodiment, the first transfer device 61 is on the first side X1 in the width direction relative to the second transfer device 62. Specifically, the first transfer device 61 is a transfer device 60 that is adjacent to the second transfer device 62 on the first side X1 in the width direction relative to the second transfer device 62. In the present embodiment, each transport device 5 includes two transfer devices 60. That is, the first transfer device 61 and the second transfer device 62 are the two transfer devices 60 included in each transport device 5. As described above, in the present embodiment, the number of articles W that can be stored next to each other in the depth direction Y in each storage section 10 and the number of transfer devices 60 included in each transport device 5 are the same (specifically, two).

Each transfer device 60 is configured to transfer an article W by moving the article W in the depth direction Y. Specifically, each transfer device 60 transfers an article W from a transfer target position such as the storage section 10 or the relay section 3 to the transport device 5 by moving the article W toward the front side Y1, and transfers an article W from the transport device 5 to a transfer target position by moving the article W toward the rear side Y2. The article W transferred from the transfer target position to the transport device 5 is held by the transport device 5 by being supported by a support portion included in the transport device 5 (e.g., a support portion included in the transfer device 60 or a support portion included the travel portion 50). FIG. 2 shows a situation in which the first transfer device 61 performs a transfer operation T of transferring an article W between the first storage position P1 in the storage section 10 and the transport device 5, and the second transfer device 62 performs a transfer operation T of transferring an article W between the second storage position P2 in the storage section 10 and the transport device 5. As described above, the transfer devices 60 are configured to be capable of transferring an article W to any storage position P (in the present embodiment, both of the first storage position P1 and the second storage position P2) in the storage section 10. Also, the first transfer device 61 and the second transfer device 62 are provided in the transport device 5 in such a manner that two articles W next to each other in the width direction X (here, two articles W next to each other in the width direction X with no other article W interposed therebetween) in the storage section 10 or the relay section 3 can be transferred between transfer target positions and the transport device 5 simultaneously or in parallel with each other with use of the two transfer devices 60.

As shown in FIG. 2, in the present embodiment, each transfer device 60 is configured to move an article W in the depth direction Y by protruding or retracting an abutting portion 66 configured to abut against the article W, in the depth direction Y (protruding the abutting portion 66 toward the rear side Y2 or retracting the abutting portion 66 toward the front side Y1) with use of a protruding/retracting mechanism 65 (e.g., a slide mechanism) Specifically, the transfer device 60 transfers an article W from the transport device 5 to a transfer target position by protruding the abutting portion 66 toward the rear side Y2 to push the article W toward the rear side Y2 with use of the abutting portion 66. Also, the transfer device 60 transfers an article W from a transfer target position to the transport device 5 by retracting the abutting portion 66 toward the front side Y1 to pull the article W toward the front side Y1 with use of the abutting portion 66. In FIG. 2, the abutting portion 66 used to push an article W toward the rear side Y2 is omitted to simplify the drawing. Note that the configuration of the transfer device 60 is not limited to this configuration. For example, it is also possible to use, as the transfer device 60, a fork-type transfer device configured to protrude and retract a support, which supports an article W from the lower side Z2, in the depth direction Y or a clamp-type transfer device configured to protrude and retract a clamp portion holding an article W in the depth direction Y.

The control device 9 controls operations of the transport device 5. The control device 9 includes an arithmetic processing device such as a CPU and a peripheral circuit such as a memory. Each function of the control device 9 is implemented through cooperation of these pieces of hardware and a program that is executed by hardware such as the arithmetic processing device. The control device 9 controls operations of the transport device 5 by controlling driving of various motors based on detection information obtained from various sensors, for example. The control device 9 controls operations of the travel portion 50 in such a manner that the travel portion 50 performs the travel operation R, and controls operations of the transfer devices 60 (in the present embodiment, operations of the first transfer device 61 and the second transfer device 62) in such a manner that the transfer devices 60 perform the transfer operation T. Technical features of the control device 9 disclosed in the present specification are also applicable to a method for controlling the transport device 5, and the method for controlling the transport device 5 is also disclosed in the present specification. This control method includes performing each processing (each step) shown in FIGS. 4 to 6.

In the present embodiment, the control device 9 performs unloading control to unload an article W from the article storage rack 1 and loading control to load an article W into the article storage rack 1 based on instructions from an upper-level control device. When performing the unloading control, the control device 9 causes the transport device 5 to perform: a travel operation R of traveling to a position corresponding to a storage location of an article W in the storage section 10 (specifically, a position at which a transfer device 60 faces the article W in the depth direction Y); a transfer operation T of transferring the article W from the storage section 10 to the transport device 5 with use of the transfer device 60; a travel operation R of traveling to a position corresponding to the relay section 3 (specifically, a position at which the transfer device 60 faces a transfer location of the article W in the relay section 3, in the depth direction Y) while holding the article W; and a transfer operation T of transferring the article W from the transport device 5 to the relay section 3 with use of the transfer device 60, in this order.

When performing the loading control, the control device 9 causes the transport device 5 to perform: a travel operation R of traveling to a position corresponding to the relay section 3 (specifically, a position at which a transfer device 60 faces an article W placed in the relay section 3, in the depth direction Y); a transfer operation T of transferring the article W from the relay section 3 to the transport device 5 with use of the transfer device 60; a travel operation R of traveling to a position corresponding to the storage section 10 (specifically, a position at which the transfer device 60 faces a storage location of the article W in the storage section 10, in the depth direction Y) while holding the article W; and a transfer operation T of transferring the article W from the transport device 5 to the storage section 10 with use of the transfer device 60, in this order.

Figure 7:
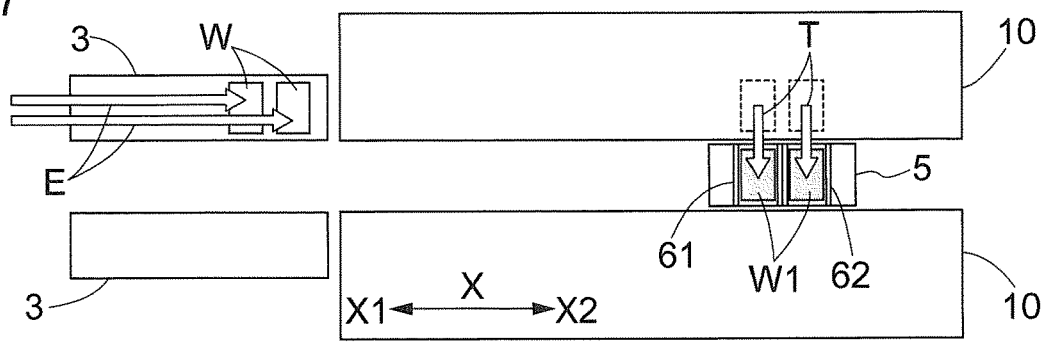
FIG. 7 is a diagram showing a situation of unloading control.
Figure 8:
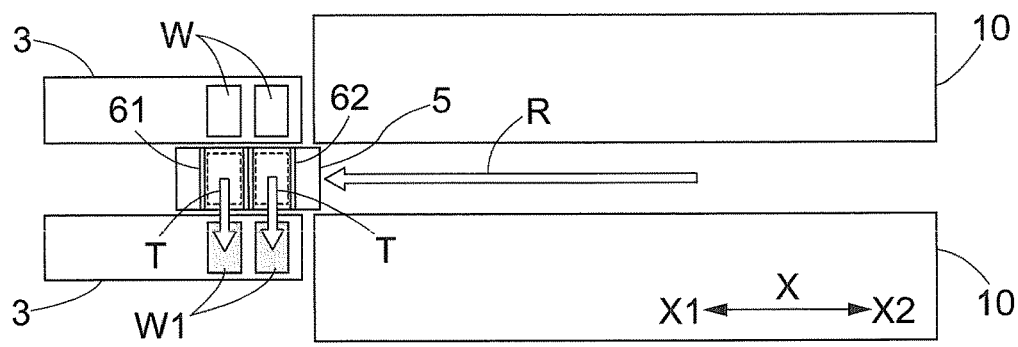
FIG. 8 is a diagram showing a situation of the unloading control.
Figure 9:
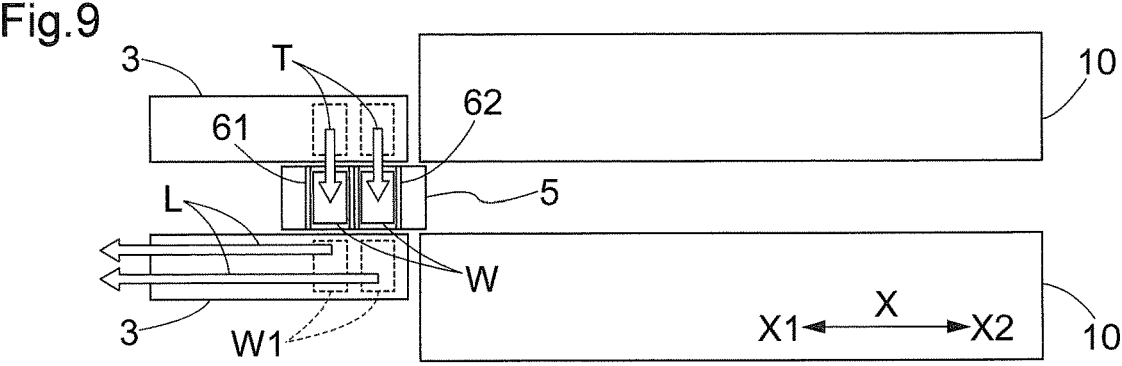
FIG. 9 is a diagram showing a situation of loading control.
Figure 10:
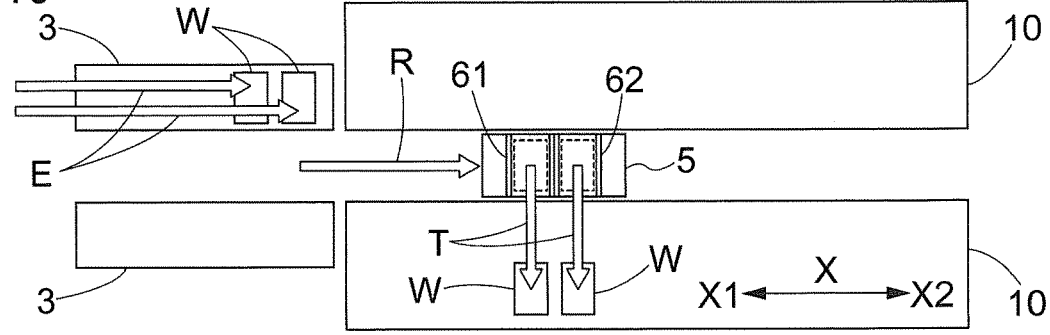
FIG. 10 is a diagram showing a situation of the loading control.

In the following description, an article W that is to be unloaded from the article storage rack 1 will be referred to as a "first article W1", and an article W that is not to be unloaded from the article storage rack 1 will be referred to as a "second article W2". FIGS. 7 to 10 show, in a chronological order, an example of situations in which the control device 9 executes unloading control to unload two first articles W1 from the article storage rack 1 and thereafter executes loading control to load two articles W into the article storage rack 1. FIG. 8 shows a situation at a point in time later than that shown in FIG. 7, FIG. 9 shows a situation at a point in time later than that shown in FIG. 8, and FIG. 10 shows a situation at a point in time later than that shown in FIG. 9.

As shown in FIG. 7, the transport device 5 performs a transfer operation T of transferring two first articles W1 from the storage section 10 to the transport device 5 with use of the first transfer device 61 and the second transfer device 62 after performing a travel operation R of traveling to a position corresponding to storage locations of the two first articles W1 in the storage section 10. In the example shown in FIG. 7, the relay device 4 is performing a carry-in operation E of carrying two articles W that are to be loaded, into the relay section 3 at this point in time. As shown in FIG. 8, the transport device 5 then performs a travel operation R of traveling to a position corresponding to the relay section 3 while holding the two first articles W1, and thereafter performs a transfer operation T of transferring the two first articles W1 from the transport device 5 to the relay section 3 with use of the first transfer device 61 and the second transfer device 62.

As shown in FIG. 9, the transport device 5 performs a transfer operation T of transferring the two articles W placed in the relay section 3 from the relay section 3 to the transport device 5 with use of the first transfer device 61 and the second transfer device 62. In the example shown in FIG. 9, the relay device 4 is performing a carry-out operation L of carrying out the two first articles W1 from the relay section 3 at this point in time. As shown in FIG. 10, the transport device 5 then performs a travel operation R of traveling to a position corresponding to the storage section 10 while holding the two articles W, and thereafter performs a transfer operation T of transferring the two articles W from the transport device 5 to the storage section 10 with use of the first transfer device 61 and the second transfer device 62. In the example shown in FIG. 10, the relay device 4 is performing a carry-in operation E of carrying two articles W that are to be loaded, into the relay section 3 at this point in time.

Incidentally, there is a case where the first article W1 that is to be unloaded is arranged next to the second article W2 that is not to be unloaded, on the rear side Y2 of the second article W2 (specifically, next to the second article W2 on the rear side Y2 thereof with no other article W interposed between the first article W1 and the second article W2) in the storage section 10. In the present embodiment, in a case where the first article W1 is stored at the second storage position P2 and the second article W2 is stored at the first storage position P1 at the same position in the width direction X, the first article W1 is next to the second article W2 on the rear side Y2 of the second article W2. The control device 9 is configured to be capable of switching a control mode of the transport device 5 to an unloading priority mode in the case where the first article W1 is arranged next to the second article W2 on the rear side Y2 of the second article W2 in the storage section 10.

In the unloading priority mode, the transport device 5 is caused to execute a first transfer operation T1, a second transfer operation T2, a first travel operation R1, a third transfer operation T3, and a second travel operation R2 in this order. Note that executing a plurality of target operations (here, the five operations described above) in a stated order means executing the plurality of target operations in the order determined in advance (here, the order of the first transfer operation T1, the second transfer operation T2, the first travel operation R1, the third transfer operation T3, and the second travel operation R2) even if an operation (for example, a travel operation R that is necessary to perform the next target operation) other than the plurality of target operations is executed between the target operations. Note that the travel operation R of the transport device 5 is performed at any time as necessary.

Here, the first transfer operation T1 is an operation of transferring the second article W2 from the storage section 10 to the transport device 5 with use of the second transfer device 62. The second transfer operation T2 is an operation of transferring the first article W1 from the storage section 10 to the transport device 5 with use of the first transfer device 61. The first travel operation R1 is an operation of traveling to a position corresponding to the relay section 3 while holding the first article W1 and the second article W2. The third transfer operation T3 is an operation of transferring the first article W1 from the transport device 5 to the relay section 3 with use of the first transfer device 61, and thereafter transferring a third article W3 that is an article W carried into the relay section 3 by the relay device 4, from the relay section 3 to the transport device 5 with use of the first transfer device 61. The second travel operation R2 is an operation of traveling to a position corresponding to the storage section 10 while holding the second article W2 and the third article W3.

Figure 5:
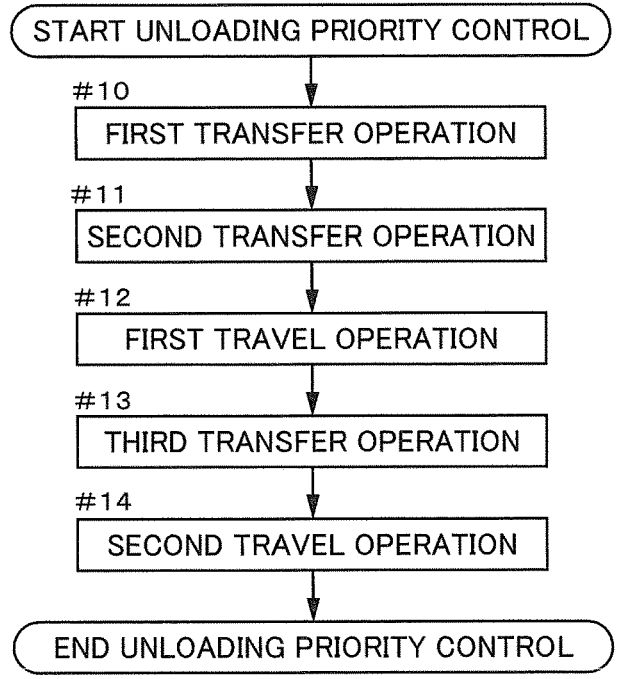
FIG. 5 is a flowchart showing a processing procedure of unloading priority control.

Upon switching the control mode of the transport device 5 to the unloading priority mode, the control device 9 performs unloading priority control to operate the transport device 5 based on the unloading priority mode. That is, a method for controlling the article storage facility 100 includes: a mode switching step of switching the control mode of the transport device 5 to the unloading priority mode; and an unloading priority control step of operating the transport device 5 based on the unloading priority mode (a step of executing the unloading priority control). As shown in FIG. 5, in the unloading priority control, operations of the transport device 5 are controlled in such a manner that the transport device 5 executes the first transfer operation T1 (step #10), the second transfer operation T2 (step #11), the first travel operation R1 (step #12), the third transfer operation T3 (step #13), and the second travel operation R2 (step #14) in this order.

Figure 11:
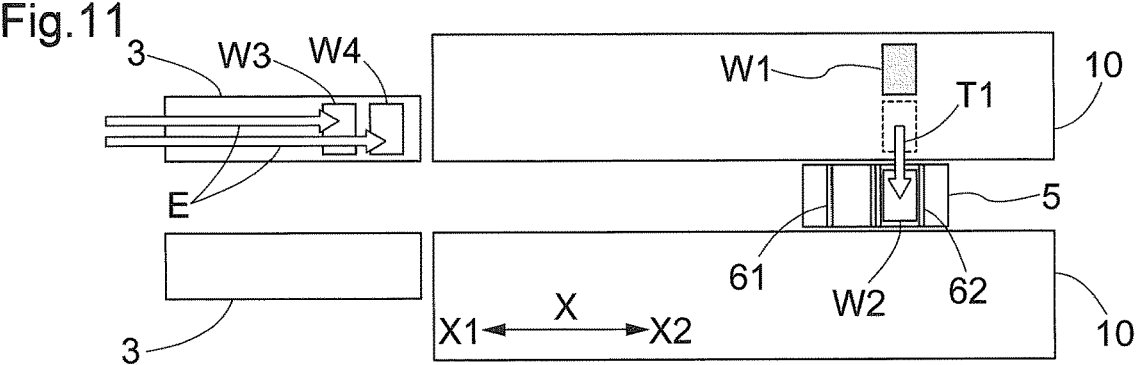
FIG. 11 is a diagram showing a situation of unloading priority control.
Figure 12:
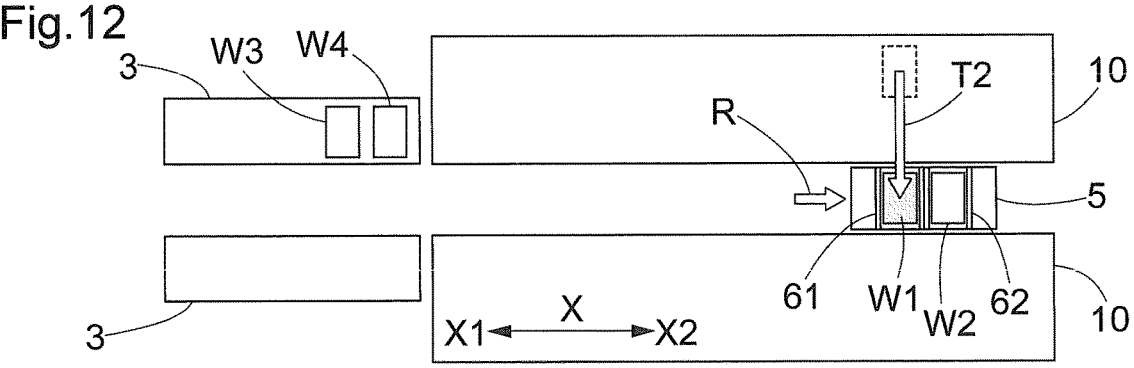
FIG. 12 is a diagram showing a situation of the unloading priority control.
Figure 13:
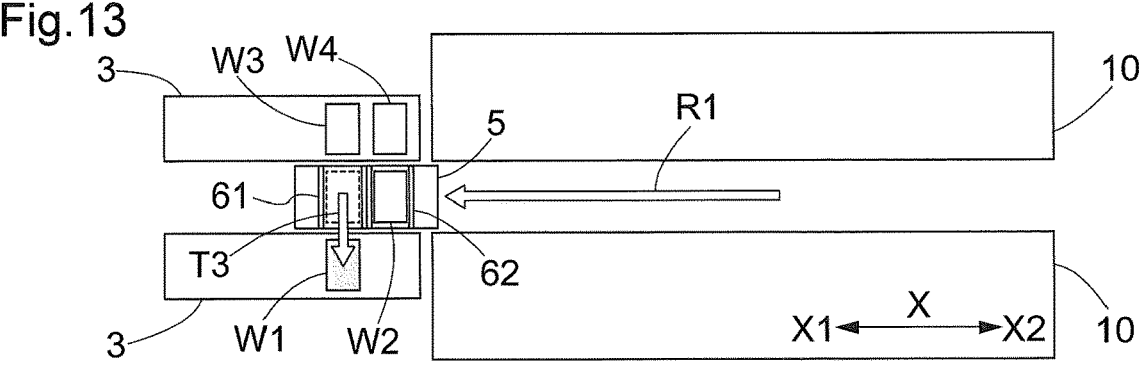
FIG. 13 is a diagram showing a situation of the unloading priority control.
Figure 14:
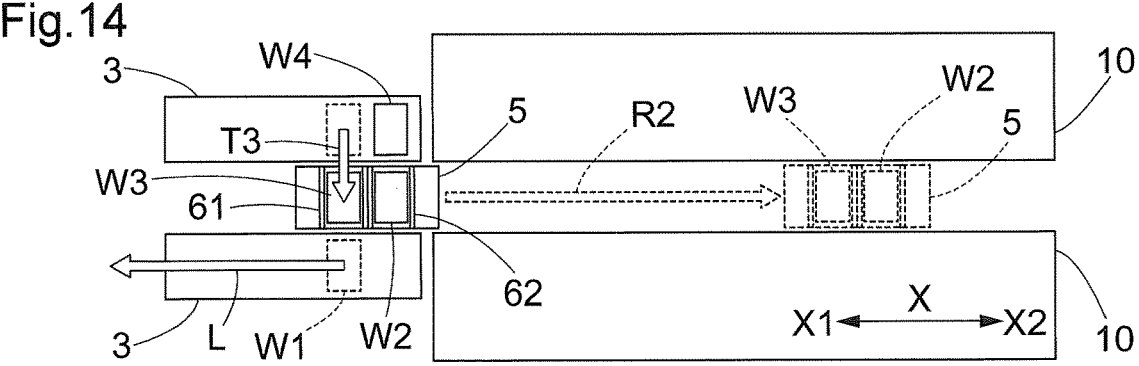
FIG. 14 is a diagram showing a situation of the unloading priority control.

FIGS. 11 to 14 show an example of situations in which the control device 9 executes the unloading priority control, in a chronological order. FIG. 12 shows a situation at a point in time later than that shown in FIG. 11, FIG. 13 shows a situation at a point in time later than that shown in FIG. 12, and FIG. 14 shows a situation at a point in time later than that shown in FIG. 13.

As shown in FIG. 11, the transport device 5 performs the first transfer operation T1 after performing a travel operation R of traveling to a position corresponding to storage locations of the first article W1 and the second article W2 (specifically, a position at which the second transfer device 62 faces the second article W2 in the depth direction Y) in the storage section 10. In this example, the relay device 4 is performing a carry-in operation E of carrying a third article W3 and a fourth article W4 that are two articles W to be loaded, into the relay section 3 at this point in time. Then, as shown in FIG. 12, the transport device 5 performs the second transfer operation T2 after performing a travel operation R (here, a travel operation R of traveling toward the second side X2 in the width direction) of traveling to a position at which the first transfer device 61 faces the first article W1 in the depth direction Y while holding the second article W2. That is, the travel operation R of traveling while holding the second article W2 is performed between the first transfer operation T1 and the second transfer operation T2.

As shown in FIG. 13, the transport device 5 performs the first travel operation R1. In the example shown in FIG. 13, the position corresponding to the relay section 3 in the first travel operation R1 is a position at which the first transfer device 61 faces the third article W3 placed in the relay section 3 in the depth direction Y. In the example shown in FIG. 13, the third article W3 is on the first side X1 in the width direction relative to the fourth article W4. After performing the first travel operation R1, the transport device 5 performs the third transfer operation T3. In the third transfer operation T3, the first article W1 is transferred from the transport device 5 to the relay section 3 with use of the first transfer device 61 (see FIG. 13), and thereafter the third article W3 is transferred from the relay section 3 to the transport device 5 with use of the first transfer device 61 (see FIG. 14). The relay device 4 performs a carry-out operation L of carrying the first article W1 transferred from the transport device 5 to the relay section 3, out of the relay section 3.

As shown in FIG. 14, the transport device 5 performs the second travel operation R2. The position corresponding to the storage section 10 in the second travel operation R2 is any of: a position at which the first transfer device 61 faces a storage location of the third article W3 in the storage section 10 in the depth direction Y; a position at which the second transfer device 62 faces a storage location of the second article W2 in the storage section 10 in the depth direction Y; and a position at which the first transfer device 61 faces the storage location of the third article W3 in the storage section 10 in the depth direction Y and the second transfer device 62 faces the storage location of the second article W2 in the storage section 10 in the depth direction Y. After performing the second travel operation R2, the transport device 5 performs a transfer operation T of transferring the third article W3 from the transport device 5 to the storage section 10 with use of the first transfer device 61 and a transfer operation T of transferring the second article W2 from the transport device 5 to the storage section 10 with use of the second transfer device 62, although these transfer operations are not illustrated.

In the present embodiment, the control device 9 is configured to be capable of switching the control mode of the transport device 5 to a loading priority mode as well as the unloading priority mode in the case where the first article W1 is arranged next to the second article W2 on the rear side Y2 of the second article W2 in the storage section 10.

In the loading priority mode, the transport device 5 is caused to execute the first transfer operation T1, the second transfer operation T2, a third travel operation R3, the third transfer operation T3, and a fourth travel operation R4 in this order, and execute a fourth transfer operation T4 between the first transfer operation T1 and the third travel operation R3, and execute a fifth transfer operation T5 between the third travel operation R3 and the fourth travel operation R4. Here, the fourth transfer operation T4 is an operation of transferring the second article W2 from the transport device 5 to the storage section 10 (specifically, a target transfer location, which will be described later) with use of the second transfer device 62. The third travel operation R3 is an operation of traveling to a position corresponding to the relay section 3 while holding the first article W1. The fifth transfer operation T5 is an operation of transferring a fourth article W4 that is an article W carried into the relay section 3 by the relay device 4, other than the third article W3, from the relay section 3 to the transport device 5 with use of the second transfer device 62. The fourth travel operation R4 is an operation of traveling to a position corresponding to the storage section 10 while holding the third article W3 and the fourth article W4.

Figure 6:
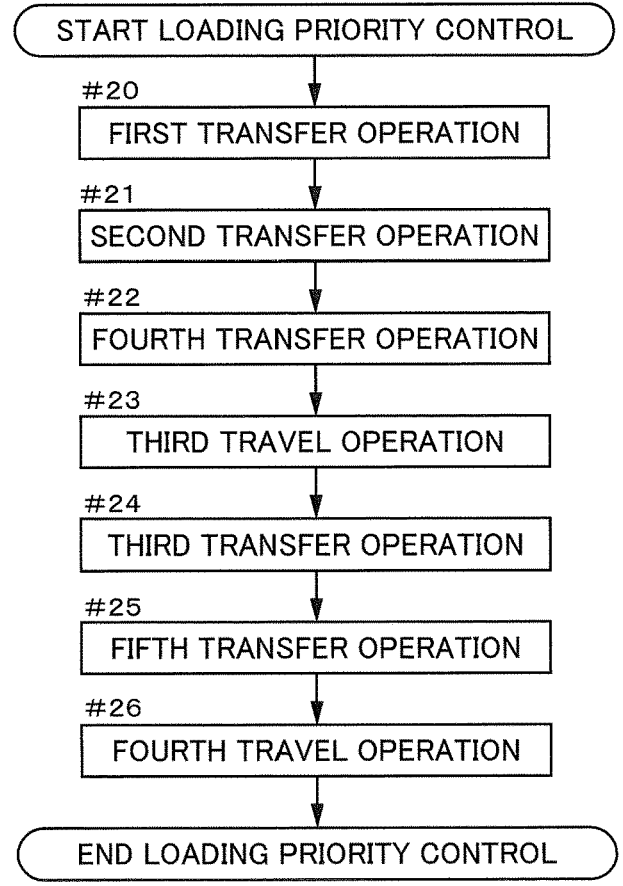
FIG. 6 is a flowchart showing a processing procedure of loading priority control.

Upon switching the control mode of the transport device 5 to the loading priority mode, the control device 9 performs loading priority control to operate the transport device 5 based on the loading priority mode. That is, a method for controlling the article storage facility 100 includes: a mode switching step of switching the control mode of the transport device 5 to the loading priority mode; and a loading priority control step of operating the transport device 5 based on the loading priority mode (a step of executing the loading priority control). As shown in FIG. 6, in the loading priority control, operations of the transport device 5 are controlled in such a manner that the transport device 5 executes the first transfer operation T1 (step #20), the second transfer operation T2 (step #21), the third travel operation R3 (step #23), the third transfer operation T3 (step #24), and the fourth travel operation R4 (step #26) in this order, and executes the fourth transfer operation T4 (step #22) between the first transfer operation T1 (step #20) and the third travel operation R3 (step #23), and executes the fifth transfer operation T5 (step #25) between the third travel operation R3 (step #23) and the fourth travel operation R4 (step #26).

FIG. 6 shows a case where the fourth transfer operation T4 is executed between the second transfer operation T2 and the third travel operation R3, but a configuration is also possible in which the fourth transfer operation T4 is executed between the first transfer operation T1 and the second transfer operation T2 or the fourth transfer operation T4 is executed in parallel with the second transfer operation T2. Note that executing two operations in parallel with each other means executing the two operations in such a manner that an operation period of one of the operations overlaps at least partially with an operation period of the other operation. Also, FIG. 6 shows a case where the fifth transfer operation T5 is executed between the third transfer operation T3 and the fourth travel operation R4, but a configuration is also possible in which the fifth transfer operation T5 is executed between the third travel operation R3 and the third transfer operation T3 or the fifth transfer operation T5 is executed in parallel with the third transfer operation T3.

Figure 15:
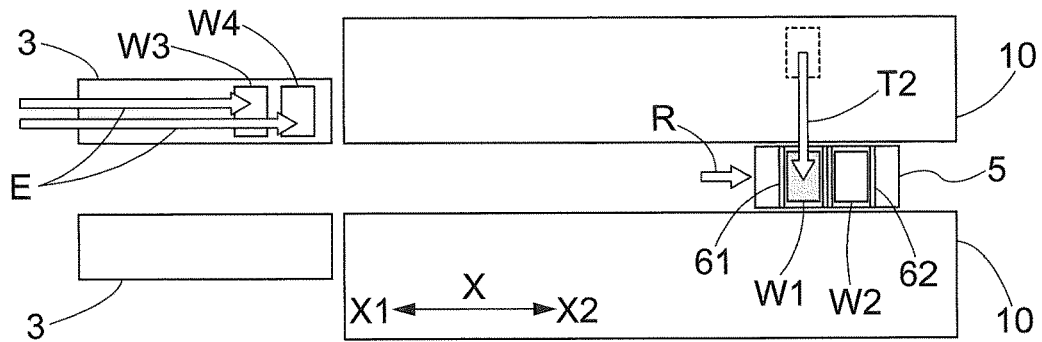
FIG. 15 is a diagram showing a situation of loading priority control.
Figure 16:
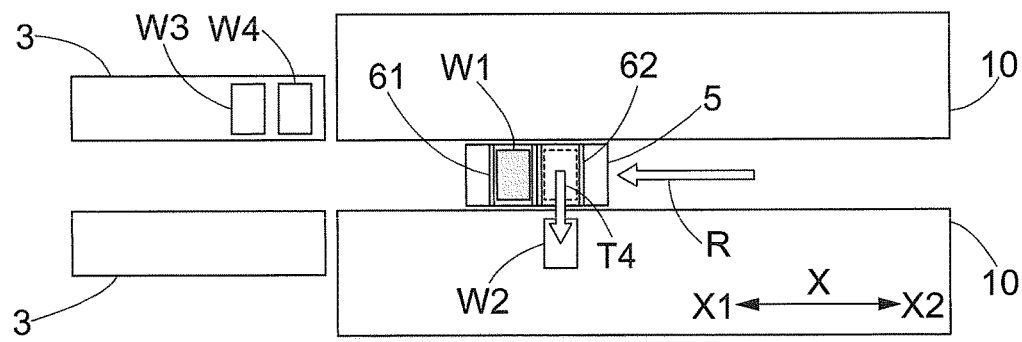
FIG. 16 is a diagram showing a situation of the loading priority control.
Figure 17:
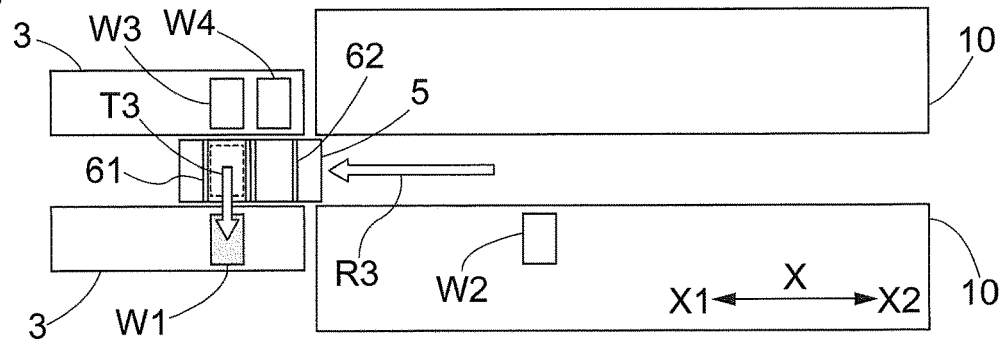
FIG. 17 is a diagram showing a situation of the loading priority control.
Figure 18:
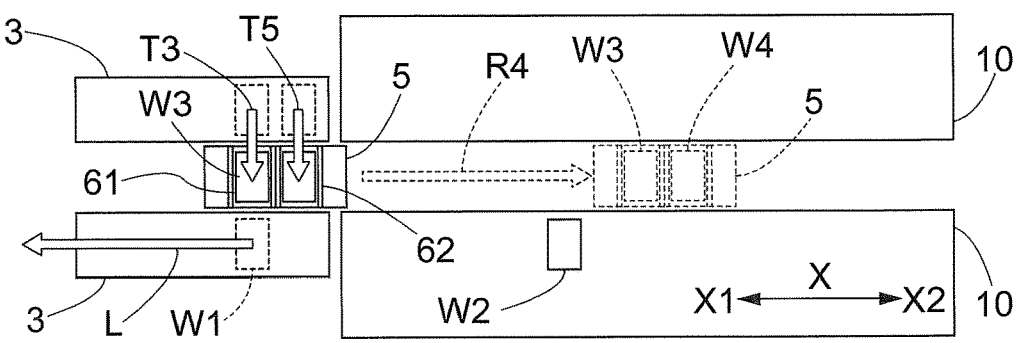
FIG. 18 is a diagram showing a situation of the loading priority control.

FIGS. 15 to 18 show an example of situations in which the control device 9 executes the loading priority control, in a chronological order. FIG. 16 shows a situation at a point in time later than that shown in FIG. 15, FIG. 17 shows a situation at a point in time later than that shown in FIG. 16, and FIG. 18 shows a situation at a point in time later than that shown in FIG. 17.

Similarly to the example shown in FIG. 11, the transport device 5 performs the first transfer operation T1 after performing the travel operation R, although these operations are not illustrated. Then, similarly to the example shown in FIG. 12, the transport device 5 performs the second transfer operation T2 after performing a travel operation R as shown in FIG. 15. In this example, the relay device 4 is performing a carry-in operation E of carrying the third article W3 and the fourth article W4 into the relay section 3 at this point in time. As shown in FIG. 16, the transport device 5 performs the fourth transfer operation T4 after performing a travel operation R of traveling to a position corresponding to a transfer location (hereinafter referred to as a "target transfer location") of the second article W2 in the storage section 10 (specifically, a position at which the second transfer device 62 faces the target transfer location in the depth direction Y) while holding the first article W1 and the second article W2. The target transfer location is a vacant location in the storage section 10.

The target transfer location may be either the first storage position P1 or the second storage position P2, but the second storage position P2 is selected as the target transfer location when no article W is stored at the first storage position P1 that is on the front side Y1 of the second storage position P2. The target transfer location may also be a location at which the first article W1 or the second article W2 has been stored. In the case where the fourth transfer operation T4 is performed after the second transfer operation T2 as in this example, the target transfer location is preferably between the relay section 3 and the locations at which the first article W1 and the second article W2 have been stored in the storage section 10 in the width direction X from the standpoint of making a travel distance of the transport device 5 in the third travel operation R3 short. Note that the control device 9 may also be configured to switch the control mode of the transport device 5 to the loading priority mode under the condition that there is a target transfer location between the relay section 3 and the locations at which the first article W1 and the second article W2 have been stored in the storage section 10 in the width direction X.

As shown in FIG. 17, the transport device 5 performs the third travel operation R3. In the example shown in FIG. 17, the position corresponding to the relay section 3 in the third travel operation R3 is a position at which the first transfer device 61 faces the third article W3 placed in the relay section 3 in the depth direction Y. In the example shown in FIG. 17, the third article W3 is on the first side X1 in the width direction relative to the fourth article W4, and the position corresponding to the relay section 3 in the third travel operation R3 is a position at which the first transfer device 61 faces the third article W3 placed in the relay section 3 in the depth direction Y and the second transfer device 62 faces the fourth article W4 placed in the relay section 3 in the depth direction Y. After performing the third travel operation R3, the transport device 5 performs the third transfer operation T3. In the third transfer operation T3, the first article W1 is transferred from the transport device 5 to the relay section 3 with use of the first transfer device 61 (see FIG. 17), and thereafter the third article W3 is transferred from the relay section 3 to the transport device 5 with use of the first transfer device 61 (see FIG. 18). The relay device 4 performs a carry-out operation L of carrying the first article W1 transferred from the transport device 5 to the relay section 3, out of the relay section 3.

As shown in FIG. 18, in this example, the transport device 5 performs the fifth transfer operation T5 in parallel with the third transfer operation T3. After performing the third transfer operation T3 and the fifth transfer operation T5, the transport device 5 performs the fourth travel operation R4. The position corresponding to the storage section 10 in the fourth travel operation R4 is any of; a position at which the first transfer device 61 faces a storage location of the third article W3 in the storage section 10 in the depth direction Y; a position at which the second transfer device 62 faces a storage location of the fourth article W4 in the storage section 10 in the depth direction Y; and a position at which the first transfer device 61 faces the storage location of the third article W3 in the storage section 10 in the depth direction Y and the second transfer device 62 faces the storage location of the fourth article W4 in the storage section 10 in the depth direction Y. After performing the fourth travel operation R4, the transport device 5 performs a transfer operation T of transferring the third article W3 from the transport device 5 to the storage section 10 with use of the first transfer device 61 and a transfer operation T of transferring the fourth article W4 from the transport device 5 to the storage section 10 with use of the second transfer device 62, although these operations are not illustrated.

In the present embodiment, the control device 9 is configured to determine, in the case where the first article W1 is arranged next to the second article W2 on the rear side Y2 of the second article W2 in the storage section 10, whether or not a priority level of unloading of the first article W1 from the article storage rack 1 is higher than a priority level of loading of the fourth article W4 into the article storage rack 1 based on at least information regarding the first article W1. That is, the method for controlling the article storage facility 100 includes a priority level determination step of determining whether or not the priority level of unloading of the first article W1 from the article storage rack 1 is higher than the priority level of loading of the fourth article W4 into the article storage rack 1. The control device 9 obtains the information regarding the first article W1 from an upper-level control device, for example. The determination described above is performed based on only the information regarding the first article W1 or based on other information (e.g., information regarding the fourth article W4) in addition to the information regarding the first article W1. Note that a configuration is also possible in which the information regarding the first article W1 is not used as the basis for the above-described determination by the control device 9.

An example of the information regarding the first article W1 is information of a time limit (e.g., a deadline for delivery or an expiration date for use) of the first article W1. In this case, the control device 9 may be configured to determine that the priority level of unloading of the first article W1 from the article storage rack 1 is higher than the priority level of loading of the fourth article W4 into the article storage rack 1, in a case where a remaining time until the time limit is shorter than a threshold. Alternatively, the information regarding the first article W1 may be information indicating whether or not the first article W1 and another article W are to be unloaded together as a group of articles W. In this case, the control device 9 may be configured to determine that the priority level of unloading of the first article W1 from the article storage rack 1 is higher than the priority level of loading of the fourth article W4 into the article storage rack 1, in a case where the first article W1 and another article W are to be unloaded together as a group of articles W.

The control device 9 switches the control mode of the transport device 5 to the unloading priority mode when it is determined that the priority level of unloading of the first article W1 from the article storage rack 1 is higher than the priority level of loading of the fourth article W4 into the article storage rack 1, and switches the control mode of the transport device 5 to the loading priority mode when it is determined that the priority level of unloading of the first article W1 from the article storage rack 1 is lower than the priority level of loading of the fourth article W4 into the article storage rack 1 (i.e., when it is not determined that the priority level of unloading of the first article W1 from the article storage rack 1 is higher than the priority level of loading of the fourth article W4 into the article storage rack 1). That is, the method for controlling the article storage facility 100 includes a mode switching step of switching the control mode of the transport device 5 to the unloading priority mode when it is determined that the priority level of unloading of the first article W1 from the article storage rack 1 is higher than the priority level of loading of the fourth article W4 into the article storage rack 1, and switching the control mode of the transport device 5 to the loading priority mode when it is determined that the priority level of unloading of the first article W1 from the article storage rack 1 is lower than the priority level of loading of the fourth article W4 into the article storage rack 1.

Figure 4:
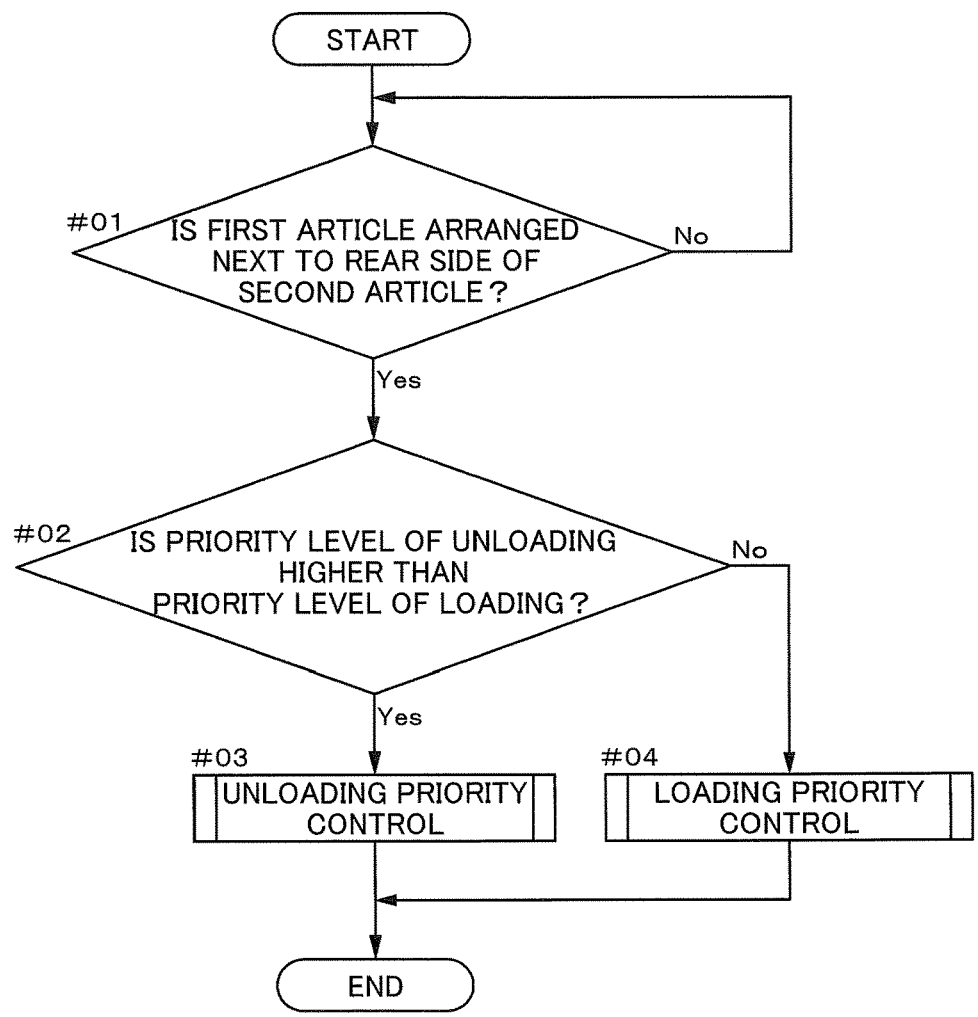
FIG. 4 is a flowchart showing a procedure of processing executed by a control device.

In the present embodiment, the control device 9 switches the control mode of the transport device 5 to the unloading priority mode or the loading priority mode following the flowchart shown in FIG. 4. Specifically, in the case where the first article W1 is arranged next to the second article W2 on the rear side Y2 of the second article W2 in the storage section 10 (step #01: Yes), the control device 9 determines whether or not the priority level of unloading of the first article W1 from the article storage rack 1 is higher than the priority level of loading of the fourth article W4 into the article storage rack 1 based on at least information regarding the first article W1 (step #02). When it is determined that the priority level of unloading of the first article W1 from the article storage rack 1 is higher than the priority level of loading of the fourth article W4 into the article storage rack 1 (step #02: Yes), the control device 9 switches the control mode of the transport device 5 to the unloading priority mode and executes the unloading priority control such as that shown in FIG. 5 (step #03). When it is not determined that the priority level of unloading of the first article W1 from the article storage rack 1 is higher than the priority level of loading of the fourth article W4 into the article storage rack 1 (step #02: No), the control device 9 switches the control mode of the transport device 5 to the loading priority mode and executes the loading priority control such as that shown in FIG. 6 (step #04).

Other Embodiments

Next, other embodiments of the article storage facility will be described.

(1) In the above embodiment, a configuration is described as an example in which the transport device 5 travels along a travel path that is set in correspondence with each stage in the article storage rack 1. However, the present disclosure is not limited to this configuration, and the transport device 5 may also be a transport device having a different configuration, such as a stacker crane, for example.

Figure 19:
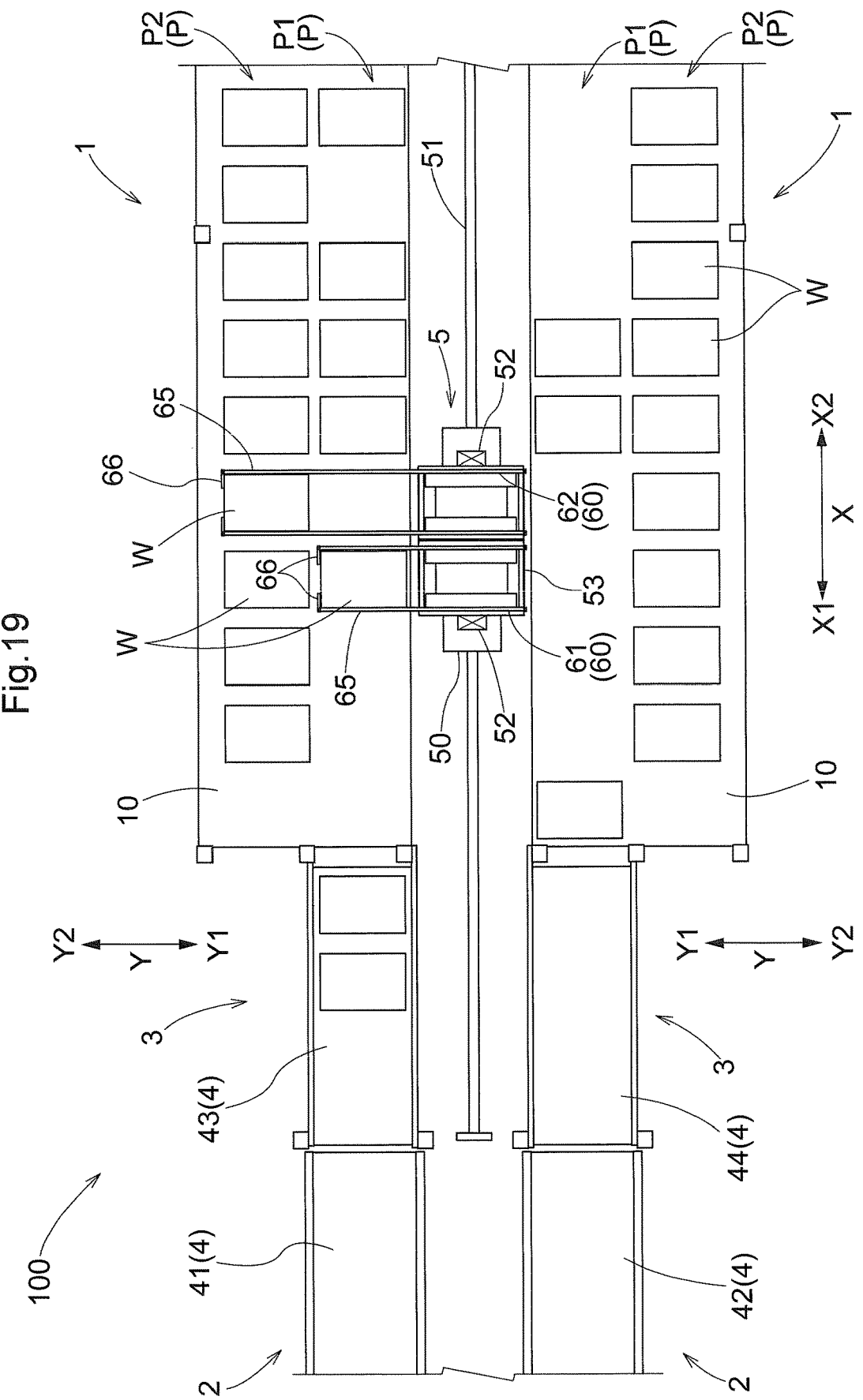
FIG. 19 is a plan view of a portion of the article storage facility according to another embodiment.

FIG. 19 shows an example case in which the transport device 5 is a stacker crane. In the example shown in FIG. 19, a rail 51 that constitutes the travel path of the transport device 5 is installed on a floor section. The transport device 5 includes a travel portion 50 configured to travel in the width direction X by being guided by the rail 51 and a lift body 53 configured to move upward and downward by being guided by a mast 52 standing on the travel portion 50. The transfer devices 60 are supported by the lift body 53, and transfer articles W between the transport device 5 and a storage section 10 in a state where the lift body 53 is moved to a height corresponding to the storage section 10 to which the articles W are to be transferred. Also, in a state where the lift body 53 is moved to a height corresponding to a relay section 3, the transfer devices 60 transfer articles W between the transport device 5 and the relay section 3. In the example shown in FIG. 19, the relay device 4 does not include the first lift device 45 and the second lift device 46, and an article W to be loaded into the article storage rack 1 is transported from the loading/unloading section 2 to the relay section 3 by the first conveyor 41 and the third conveyor 43 in this order, and an article W unloaded from the article storage rack 1 is transported from the relay section 3 to the loading/unloading section 2 by the fourth conveyor 44 and the second conveyer 42 in this order.

(2) In the above embodiment, a configuration is described as an example in which the control device 9 switches the control mode of the transport device 5 to the unloading priority mode or the loading priority mode based on the determination as to whether or not the priority level of unloading of the first article W1 from the article storage rack 1 is higher than the priority level of loading of the fourth article W4 into the article storage rack 1. However, the present disclosure is not limited to this configuration, and a configuration is also possible in which the control device 9 switches the control mode of the transport device 5 to the unloading priority mode or the loading priority mode without determining whether or not the priority level of unloading of the first article W1 from the article storage rack 1 is higher than the priority level of loading of the fourth article W4 into the article storage rack 1. For example, the control device 9 may also be configured to switch the control mode of the transport device 5 to the unloading priority mode in a situation in which the number of articles W to be unloaded from the article storage rack 1 is larger than the number of articles W to be loaded into the article storage rack 1, or in a time slot or a period of time during which the number of articles W unloaded from the article storage rack 1 is usually larger than the number of articles W loaded into the article storage rack 1.

(3) In the above embodiment, a configuration is described as an example in which the control device 9 is capable of switching the control mode of the transport device 5 to the loading priority mode as well as the unloading priority mode in the case where the first article W1 is arranged next to the second article W2 on the rear side Y2 of the second article W2 in the storage section 10. However, the present disclosure is not limited to this configuration, and a configuration is also possible in which the control device 9 always switches the control mode of the transport device 5 to the unloading priority mode in the case where the first article W1 is arranged next to the second article W2 on the rear side Y2 of the second article W2 in the storage section 10, in view of the fact that unloading of an article W from the article storage rack 1 commonly needs to be performed immediately compared with loading of an article W into the article storage rack 1 because an article W is unloaded from the article storage rack 1 when the article W is needed.

(4) In the above embodiment, a configuration is described as an example in which the first transfer device 61 is on the first side X1 in the width direction relative to the second transfer device 62. However, the present disclosure is not limited to this configuration, and a configuration is also possible in which the first transfer device 61 is on the second side X2 in the width direction relative to the second transfer device 62. In this case, unlike the above embodiment, the travel operations R shown in FIGS. 12 and 15 are operations of traveling to the first side X1 in the width direction, and the third article W3 is arranged on the second side X2 in the width direction relative to the fourth article W4 in the relay section 3.

(5) In the above embodiment, a configuration is described as an example in which the number of articles W that can be stored next to each other in the depth direction Y in the storage section 10 and the number of transfer devices 60 included in the transport device 5 are both two. However, the present disclosure is not limited to this configuration, and these numbers may also be an integer equal to or larger than three (e.g., three). Also, unlike the above embodiment, the number of articles W that can be stored next to each other in the depth direction Y in the storage section 10 may be different from the number of transfer devices 60 included in the transport device 5. In a configuration in which three or more articles W can be stored next to each other in the depth direction Y in the storage section 10, each control described in the above embodiment is executed by the control device 9 in a case where the second article W2 is stored at a storage position P that is closest to the front side Y1 or a case where no other article W is stored on the front side Y1 of the second article W2.

(6) The configurations disclosed in each of the above embodiments can be applied in combination with configurations disclosed in the other embodiments (the other embodiments described above can also be combined with each other) as long as no contradiction arises. The embodiments disclosed in the present specification including other configurations are merely examples in all aspects. Accordingly, various modifications can be made as appropriate within a range not departing from the gist of the present disclosure.

Summary of the Above Embodiment

The following describes a summary of the article storage facility described above.

An article storage facility includes: an article storage rack including a storage section in which a plurality of articles are storable next to each other in a depth direction; a loading/unloading section that is outside the storage section in a width direction of the article storage rack and through which an article is carried in and carried out; a relay device configured to transport an article between the loading/unloading section and a relay section that is between the loading/unloading section and the storage section in the width direction; a transport device configured to travel in the width direction on a front side in the depth direction relative to the storage section and transport an article between the storage section and the relay section; and a control device configured to control operations of the transport device, in which the transport device includes a plurality of transfer devices that are next to each other in the width direction, are capable of transferring articles to the storage section and the relay section, and include a first transfer device and a second transfer device, the control device is configured to be capable of switching a control mode of the transport device to an unloading priority mode in a case where a first article that is to be unloaded from the article storage rack is arranged next to a second article that is not to be unloaded from the article storage rack, on a rear side of the second article in the storage section, the rear side being opposite to the front side in the depth direction, the unloading priority mode is a mode for causing the transport device to execute a first transfer operation, a second transfer operation, a first travel operation, a third transfer operation, and a second travel operation in this order, the first transfer operation is an operation of transferring the second article from the storage section to the transport device with use of the second transfer device, the second transfer operation is an operation of transferring the first article from the storage section to the transport device with use of the first transfer device, the first travel operation is an operation of traveling to a position corresponding to the relay section while holding the first article and the second article, the third transfer operation is an operation of transferring the first article from the transport device to the relay section with use of the first transfer device, and thereafter transferring a third article carried into the relay section by the relay device, from the relay section to the transport device with use of the first transfer device, and the second travel operation is an operation of traveling to a position corresponding to the storage section while holding the second article and the third article.

According to this configuration, the control mode of the transport device can be switched to the unloading priority mode in the case where the first article to be unloaded from the article storage rack is arranged next to the second article that is not to be unloaded from the article storage rack, on the rear side of the second article in the storage section of the article storage rack. In the unloading priority mode, it is possible to transfer the second article and the first article in this order from the storage section to the transport device, then cause the transport device holding the second article as well as the first article to travel to the position corresponding to the relay section, and transfer the first article from the transport device to the relay section. Accordingly, when compared with a case where the transport device holding the first article is caused to travel to the position corresponding to the relay section after the second article is transferred from the transport device to the storage section (i.e., returned to the storage section), the time it takes until the first article is carried out to the relay section can be reduced because an operation for transferring the second article from the transport device to the storage section is not performed.

Furthermore, in the unloading priority mode, after the first article is transferred from the transport device to the relay section, the third article carried into the relay section by the relay device (i.e., an article to be loaded into the article storage rack) can be transferred from the relay section to the transport device, and then the transport device holding the second article and the third article can be caused to travel to the position corresponding to the storage section to transfer the second article and the third article from the transport device to the storage section. Therefore, the third article can be transported from the relay section to the position corresponding to the storage section with use of the travel operation of the transport device for returning the second article to the storage section, and the efficiency of transporting articles in the entire facility can be improved when compared with a case where the second article is returned to the storage section without the operation for transferring the third article from the relay section to the transport device being performed.

As described above, according to this configuration, in the case where the first article is arranged next to the second article on the rear side of the second article in the article storage rack, it is possible to reduce the time it takes until the first article is carried out to the relay section while improving the efficiency of transporting articles in the entire facility.

Here, it is preferable that the control device is configured to be capable of switching the control mode of the transport device to a loading priority mode as well as the unloading priority mode in the case where the first article is arranged next to the second article on the rear side of the second article in the storage section, the loading priority mode is a mode for causing the transport device to execute the first transfer operation, the second transfer operation, a third travel operation, the third transfer operation, and a fourth travel operation in this order, and causing the transport device to execute a fourth transfer operation between the first transfer operation and the third travel operation and execute a fifth transfer operation between the third travel operation and the fourth travel operation, the fourth transfer operation is an operation of transferring the second article from the transport device to the storage section with use of the second transfer device, the third travel operation is an operation of traveling to a position corresponding to the relay section while holding the first article, the fifth transfer operation is an operation of transferring a fourth article that is an article carried into the relay section by the relay device, other than the third article, from the relay section to the transport device with use of the second transfer device, and the fourth travel operation is an operation of traveling to a position corresponding to the storage section while holding the third article and the fourth article.

According to this configuration, the control mode of the transport device can be switched to not only the unloading priority mode but also the loading priority mode in the case where the first article to be unloaded from the article storage rack is arranged next to the second article that is not to be unloaded from the article storage rack, on the rear side of the second article in the storage section of the article storage rack. In the loading priority mode, it is possible to cause the transport device from which the second article has been transferred to the storage section (i.e., the transport device not holding the second article) to travel to the position corresponding to the relay section to transfer the first article from the transport device to the relay section. In the loading priority mode, the time it takes until the first article is carried out to the relay section is likely to be longer than that in the unloading priority mode, but it is possible to transport the fourth article from the relay section to the position corresponding to the storage section with use of the travel operation of the transport device for transporting the third article from the relay section to the position corresponding to the storage section. Therefore, it is possible to efficiently load a plurality of articles into the article storage rack while carrying out the first article to the relay section. Accordingly, it is possible to improve the efficiency of transporting articles in the entire facility by switching the control mode of the transport device to the loading priority mode in a situation in which requests to load articles into the article storage rack are frequently issued, for example.

In the configuration in which the control device is configured to be capable of switching the control mode of the transport device to the loading priority mode as well as the unloading priority mode in the case where the first article is arranged next to the second article on the rear side of the second article in the storage section as described above, it is preferable that the control device determines whether or not a priority level of unloading of the first article from the article storage rack is higher than a priority level of loading of the fourth article into the article storage rack based on at least information regarding the first article, and switches the control mode of the transport device to the unloading priority mode when it is determined that the priority level of unloading of the first article from the article storage rack is higher than the priority level of loading of the fourth article into the article storage rack, and switches the control mode of the transport device to the loading priority mode when it is determined that the priority level of unloading of the first article from the article storage rack is lower than the priority level of loading of the fourth article into the article storage rack.

According to this configuration, in a situation in which the priority level of unloading of the first article from the article storage rack is higher than the priority level of loading of the fourth article into the article storage rack, it is possible to immediately carry out the first article to the relay section by switching the control mode of the transport device to the unloading priority mode. On the other hand, in a situation in which the priority level of unloading of the first article from the article storage rack is lower than the priority level of loading of the fourth article into the article storage rack, it is possible to efficiently load a plurality of articles into the article storage rack while carrying out the first article to the relay section, by switching the control mode of the transport device to the loading priority mode.

It is sufficient that an article storage facility according to the present disclosure has at least one of the effects described above.

DESCRIPTION OF REFERENCE SIGNS

1: Article storage rack
2: Loading/unloading section
3: Relay section
4: Relay device
5: Transport device
9: Control device
10: Storage section
60: Transfer device
61: First transfer device
62: Second transfer device
100: Article storage facility
R1: First travel operation
R2: Second travel operation
R3: Third travel operation
R4: Fourth travel operation
T1: First transfer operation
T2: Second transfer operation
T3: Third transfer operation
T4: Fourth transfer operation
T5: Fifth transfer operation
W: Article
W1: First article
W2: Second article
W3: Third article
W4: Fourth article
X: Width direction
Y: Depth direction
Y1: Front side
Y2: Rear side

The invention claimed is:

1. An article storage facility comprising:
an article storage rack comprising a storage section in which a plurality of articles are storable next to each other in a depth direction;
a loading/unloading section that is outside the storage section in a width direction of the article storage rack and through which an article is carried in and carried out;
a relay device configured to transport an article between the loading/unloading section and a relay section that is between the loading/unloading section and the storage section in the width direction;
a transport device configured to travel in the width direction on a front side in the depth direction relative to the storage section and transport an article between the storage section and the relay section; and
a control device configured to control operations of the transport device,
wherein:
the transport device comprises a plurality of transfer devices that are next to each other in the width direction, are capable of transferring articles to the storage section and the relay section, and comprise a first transfer device and a second transfer device,
the control device is configured to switch a control mode of the transport device to an unloading priority mode in a case where a first article that is to be unloaded from the article storage rack is arranged next to a second article that is not to be unloaded from the article storage rack, on a rear side of the second article in the storage section, the rear side is opposite to the front side in the depth direction,
the unloading priority mode is a mode for causing the transport device to execute a first transfer operation, a second transfer operation, a first travel operation, a third transfer operation, and a second travel operation in this order,
the first transfer operation is an operation of transferring the second article from the storage section to the transport device with use of the second transfer device,
the second transfer operation is an operation of transferring the first article from the storage section to the transport device with use of the first transfer device,
the first travel operation is an operation of traveling to a position corresponding to the relay section while holding the first article and the second article,
the third transfer operation is an operation of transferring the first article from the transport device to the relay section with use of the first transfer device, and thereafter transferring a third article carried into the relay section by the relay device, from the relay section to the transport device with use of the first transfer device, and
the second travel operation is an operation of traveling to a position corresponding to the storage section while holding the second article and the third article.

2. The article storage facility according to claim 1, wherein:
the control device is configured to switch the control mode of the transport device to a loading priority mode as well as the unloading priority mode in the case where the first article is arranged next to the second article on the rear side of the second article in the storage section, the loading priority mode is a mode for causing the transport device to execute the first transfer operation, the second transfer operation, a third travel operation, the third transfer operation, and a fourth travel operation in this order, and causing the transport device to execute a fourth transfer operation between the first transfer operation and the third travel operation and execute a fifth transfer operation between the third travel operation and the fourth travel operation, the fourth transfer operation is an operation of transferring the second article from the transport device to the storage section with use of the second transfer device, the third travel operation is an operation of traveling to a position corresponding to the relay section while holding the first article, the fifth transfer operation is an operation of transferring a fourth article that is an article carried into the relay section by the relay device, other than the third article, from the relay section to the transport device with use of the second transfer device, and the fourth travel operation is an operation of traveling to a position corresponding to the storage section while holding the third article and the fourth article.

3. The article storage facility according to claim 2, wherein the control device determines whether or not a priority level of unloading of the first article from the article storage rack is higher than a priority level of loading of the fourth article into the article storage rack based on at least information regarding the first article, and switches the control mode of the transport device to the unloading priority mode when it is determined that the priority level of unloading of the first article from the article storage rack is higher than the priority level of loading of the fourth article into the article storage rack, and switches the control mode of the transport device to the loading priority mode when it is determined that the priority level of unloading of the first article from the article storage rack is lower than the priority level of loading of the fourth article into the article storage rack.

\* \* \* \* \*